(12) United States Patent
Lee

(10) Patent No.: US 11,363,222 B2
(45) Date of Patent: Jun. 14, 2022

(54) IMAGE SENSING DEVICE

(71) Applicant: SK hynix Inc., Icheon-si (KR)

(72) Inventor: Kyoung In Lee, Icheon-si (KR)

(73) Assignee: SK HYNIX INC., Icheon-si (KR)

( * ) Notice: Subject to any disclaimer, the term of this patent is extended or adjusted under 35 U.S.C. 154(b) by 0 days.

(21) Appl. No.: 17/194,760

(22) Filed: Mar. 8, 2021

(65) Prior Publication Data

US 2021/0400221 A1 Dec. 23, 2021

(30) Foreign Application Priority Data

Jun. 18, 2020 (KR) ........................ 10-2020-0074147

(51) Int. Cl.
*H04N 5/369* (2011.01)
*H04N 9/04* (2006.01)
*H04N 5/378* (2011.01)

(52) U.S. Cl.
CPC ......... *H04N 5/36961* (2018.08); *H04N 5/378* (2013.01); *H04N 9/0455* (2018.08); *H04N 9/04557* (2018.08)

(58) Field of Classification Search
CPC .. H04N 5/378; H04N 9/0455; H04N 5/36961; H04N 9/04557
See application file for complete search history.

(56) References Cited

U.S. PATENT DOCUMENTS

| 10,397,465 | B2 | 8/2019 | Galor Gluskin et al. |
| 10,999,544 | B2 * | 5/2021 | Wang ................ H01L 27/14605 |
| 2015/0350583 | A1 * | 12/2015 | Mauritzson ........... H04N 5/374 |
| | | | 250/208.1 |
| 2020/0388643 | A1 * | 12/2020 | Ma ...................... H01L 27/1462 |
| 2021/0120198 | A1 * | 4/2021 | Kim .................. H01L 27/14621 |

FOREIGN PATENT DOCUMENTS

KR 10-2019-0089017 A 7/2019

\* cited by examiner

*Primary Examiner* — Lin Ye
*Assistant Examiner* — Chriss S Yoder, III
(74) *Attorney, Agent, or Firm* — Perkins Coie LLP

(57) ABSTRACT

An image sensing device includes a first sub-pixel array including a plurality of unit pixels having a first color arranged adjacent to each other, a second sub-pixel array including a plurality of unit pixels having a second color arranged adjacent to the first sub-pixel array in a first direction, a third sub-pixel array including a plurality of unit pixels having a third color arranged adjacent to the second sub-pixel array in a second direction perpendicular to the first direction, and a fourth sub-pixel array including a plurality of unit pixels having the second color arranged adjacent to the first sub-pixel array and the second sub-pixel array in the second direction. The fourth sub-pixel array includes a plurality of phase detection pixels for detecting a phase difference in at least the first direction.

20 Claims, 4 Drawing Sheets

IMAGE SENSING DEVICE

CROSS-REFERENCE TO RELATED APPLICATION

This patent document claims the priority and benefits of Korean patent application No. 10-2020-0074147, filed on Jun. 18, 2020, which is incorporated by reference in its entirety as part of the disclosure of this patent document.

TECHNICAL FIELD

The technology and implementations disclosed in this patent document generally relate to an image sensing device.

BACKGROUND

An image sensor is used in electronic devices to convert optical images into electrical signals. The recent development of automotive, medical, computer and communication industries is leading to an increase in demand for highly integrated, high-performance image sensors in various electronic devices such as digital cameras, camcorders, personal communication systems (PCSs), video game consoles, surveillance cameras, medical micro-cameras, and robots.

SUMMARY

Various embodiments of the disclosed technology relate to an image sensing device including phase detection pixels arranged in a layout that can improve operational characteristics of the phase detection pixels.

In an embodiment of the disclosed technology, an image sensing device may include a first sub-pixel array including a plurality of first unit pixels including first photosensing elements that are located adjacent to one another and are structured to generate photocharges by converting incident light and first color filters located over the first photosensing elements, a second sub-pixel array including a plurality of second unit pixels including second photosensing elements that are located adjacent to one another and are structured to generate photocharges by converting incident light and second color filters located over the second photosensing elements, a third sub-pixel array including a plurality of third unit pixels including third photosensing elements that are located adjacent to one another and are structured to generate photocharges by converting incident light and third color filters located over the third photosensing elements, and a fourth sub-pixel array including a plurality of fourth unit pixels including fourth photosensing elements that are located adjacent to one another and are structured to generate photocharges by converting incident light and fourth color filters located over the fourth photosensing elements. The second sub-pixel array is arranged adjacent to the first sub-pixel array in a first direction, the third sub-pixel array is arranged adjacent to the second sub-pixel array in a second direction perpendicular to the first direction, the fourth sub-pixel array is arranged adjacent to the first sub-pixel array and the second sub-pixel array in the second direction, and the fourth sub-pixel array further includes a plurality of phase detection pixels for detecting a phase difference.

In another embodiment of the disclosed technology, an image sensing device may include a pixel array including a plurality of unit pixels configured to generate an electrical signal by performing photoelectric conversion of incident light and consecutively arranged in a first direction and a second direction perpendicular to the first direction. The pixel array may include a first unit pixel array including unit pixels with first to third color filters arranged in a first color pattern, and a second unit pixel array including unit pixels with the first to third color filters are arranged in a second color pattern. In this case, the unit pixels of the first unit pixel array may be image pixels structured to detect incident light from a target object to generate an image signal representing the target object by converting an optical image of the target object to an electrical signal. The second unit pixel array may include image pixels configured to generate the image signal, and phase detection pixels configured to detect a phase difference between optical signals from the target object.

In another embodiment of the disclosed technology, an image sensing device may include a first sub-pixel array including a plurality of first unit pixels including (1) first photosensing elements that are located adjacent to one another and are structured to generate photocharges by performing photoelectric conversion of incident light and (2) first color filters arranged adjacent to one another and located over the first photosensing elements, respectively, to filter incident light in a first color to be received and detected by the first photosensing elements, a second sub-pixel array including a plurality of second unit pixels including (1) second photosensing elements that are located adjacent to one another and are structured to generate photocharges by performing photoelectric conversion of incident light and (2) second color filters arranged adjacent to one another and located over the second photosensing elements, respectively, to filter incident light in a second color to be received and detected by the second photosensing elements, wherein the second sub-pixel array is arranged adjacent to the first sub-pixel array in a first direction, a third sub-pixel array including (1) third photosensing elements that are located adjacent to one another and are structured to generate photocharges by performing photoelectric conversion of incident light and (2) third color filters arranged adjacent to one another and located over the third photosensing elements, respectively, to filter incident light in a third color to be received and detected by the third photosensing elements, wherein the third sub-pixel array is arranged adjacent to the second sub-pixel array in a second direction perpendicular to the first direction, and a fourth sub-pixel array including (1) fourth photosensing elements that are located adjacent to one another and are structured to generate photocharges by performing photoelectric conversion of incident light and (2) fourth color filters arranged adjacent to one another and located over the fourth photosensing elements, respectively, to filter incident light in a fourth color to be received and detected by the fourth photosensing elements, wherein the fourth sub-pixel array is arranged adjacent to the first sub-pixel array and the second sub-pixel array in the second direction, wherein the fourth sub-pixel array further includes a plurality of phase detection pixels for detecting a phase difference in at least the first direction.

In another embodiment of the disclosed technology, an image sensing device may include a pixel array including a plurality of unit pixels configured to generate an electrical signal by performing photoelectric conversion of incident light and consecutively arranged in a first direction and a second direction perpendicular to the first direction. The pixel array includes a first unit pixel array including unit pixels with first to third color filters arranged in a first color pattern, and a second unit pixel array including unit pixels with the first to third color filters arranged in a second color pattern. The unit pixels of the first unit pixel array are image pixels configured to detect incident light from a target object to generate an image signal representing the target object by converting an optical image of the target object to an electrical signal. The second unit pixel array includes image pixels configured to generate the image signal, and one pair of phase detection pixels configured to detect a phase difference between optical signals from the target object.

In another embodiment of the disclosed technology, an image sensing device may include a first sub-pixel array in which a plurality of unit pixels having a first color is arranged adjacent to each other, a second sub-pixel array in which a plurality of unit pixels having a second color is arranged adjacent to the first sub-pixel array in a first direction, a third sub-pixel array in which a plurality of unit pixels having a third color is arranged adjacent to the second sub-pixel array in a second direction perpendicular to the first direction, and a fourth sub-pixel array in which a plurality of unit pixels having the second color is arranged adjacent to the first sub-pixel array and the second sub-pixel array in the second direction, wherein the fourth sub-pixel array includes a plurality of phase detection pixels for detecting a phase difference in at least the first direction.

In another embodiment of the disclosed technology, an image sensing device may include a pixel array in which a plurality of unit pixels configured to generate an electrical signal by performing photoelectric conversion of incident light is consecutively arranged in a first direction and a second direction perpendicular to the first direction. The pixel array may include a first unit pixel array in which unit pixels having first to third colors are arranged in a first color pattern, and a second unit pixel array in which unit pixels having the first to third colors are arranged in a second color pattern. In this case, all of the unit pixels of the first unit pixel array may be image pixels configured to generate an image signal corresponding to a target object to be captured. The second unit pixel array may include image pixels configured to generate the image signal, and one pair of phase detection pixels configured to detect a phase difference between captured images.

It is to be understood that both the foregoing general description and the following detailed description of the disclosed technology are illustrative and explanatory and are intended to provide further explanation of the disclosure as claimed.

DETAILED DESCRIPTION

This patent document provides implementations and examples of an image sensing device including imaging pixels and phase detection pixels arranged to improve operational characteristics of the phase detection pixels.

Reference will now be made in detail to certain embodiments, examples of which are illustrated in the accompanying drawings. Wherever possible, the same reference numbers will be used throughout the drawings to refer to the same or similar parts. In the following description, a detailed description of related known configurations or functions incorporated herein will be omitted to avoid obscuring the subject matter.

Figure 1:
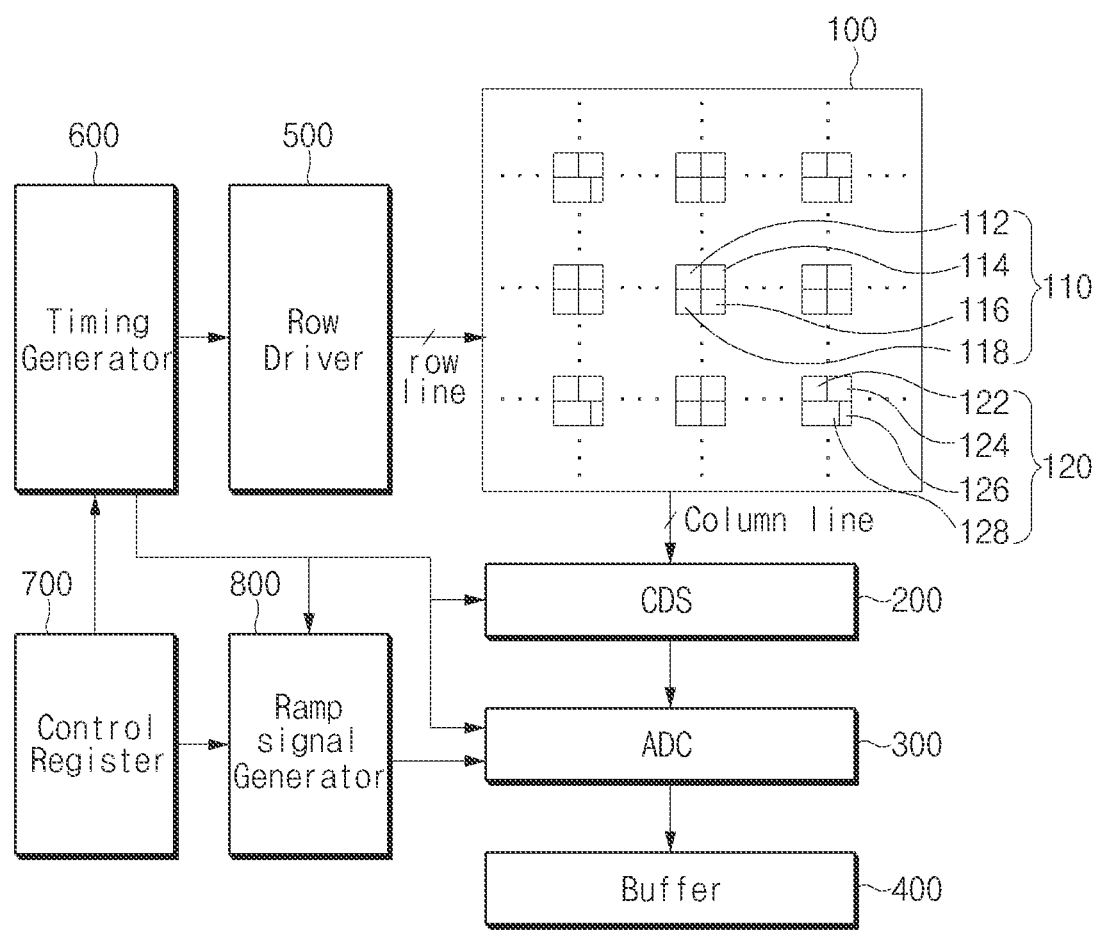
FIG. 1 is a block diagram illustrating an example of an image sensing device based on some implementations of the disclosed technology.

FIG. 1 is a block diagram illustrating an example of an image sensing device based on some implementations of the disclosed technology.

In some implementations, the image sensing device may include a pixel array 100, a correlated double sampler (CDS) 200, an analog-to-digital converter (ADC) 300, a buffer 400, a row driver 500, a timing generator 600, a control register 700, and a ramp signal generator 800.

The pixel array 100 may include a plurality of unit pixels consecutively arranged in a two-dimensional (2D) array. The plurality of unit pixels may be structured to convert incident light into an electrical signal corresponding to the strength and wavelength of the incident light by performing photoelectric conversion of the incident light. For example, the plurality of unit pixels may include a plurality of photosensing elements. Each photosensing element is structured to generate photocharges by performing photoelectric conversion of incident light and, in implementations, may include a photodiode. The plurality of unit pixels may include a plurality of image pixels and a plurality of phase detection pixels. Each of the image pixels may generate an image signal corresponding to a target object by capturing and converting a part of the optical image of the target object to an electrical signal. Each of the phase detection pixels may generate a phase signal, which is an electrical signal used to calculate a phase difference between captured images of the target object. The pixel array 100 may include a plurality of first unit pixel arrays 110 including image pixels arranged in a quad array (e.g., quad color filter array), and a plurality of second unit pixel arrays 120 including image pixels arranged together with phase detection pixels. For example, the first unit pixel arrays 110 may include four sub-pixel arrays 112, 114, 116, and 118 that are arranged contiguous (or adjacent) to each other while having the same color filter thereon. The sub-pixel arrays 112, 114, 116, and 118 may be arranged in a Bayer pattern. The second unit pixel arrays 120 may include sub-pixel arrays 122 and 124, a sub-pixel array 126, and a sub-pixel array 128. In some implementations, each of the sub-pixel arrays 122 and 124 may include four unit-pixels that are arranged contiguous (or adjacent) to each other while having the same color filter thereon. The sub-pixel array 126 may include two unit-pixels that are arranged contiguous (or adjacent) to each other while having the same color filter thereon. The sub-pixel array 128 may include six unit-pixels that are arranged contiguous (or adjacent) to each other while having the same color filter thereon. In this case, the sub-pixel array 128 may include two phase detection pixels that are contiguous (or adjacent) to each other in a row direction to detect a phase difference in a row direction, or may include four phase detection pixels that are arranged contiguous (or adjacent) to each other in row and column directions to detect both phase differences in row and column directions. Detailed structures of the first unit pixel array 110 and the second unit pixel array 120 will hereinafter be described with reference to the attached drawings. By way of example, FIG. 1 illustrates the locations of the first unit pixel array 110 and the second unit pixel array 120 in the pixel array 100, it should be noted that the locations of the first unit pixel array 110 and the second unit pixel array 120 can be different from what is illustrated in the drawings. In addition, the number of the second unit pixel arrays 120 can vary depending on the desired functionality of image sensing devices.

CMOS image sensors may use the correlated double sampling (CDS) to remove an undesired offset value of pixels by sampling a pixel signal twice to remove the difference between these two samples. In one example, the correlated double sampling (CDS) may remove the undesired offset value of pixels by comparing pixel output voltages obtained before and after a light signal is incident on the pixels so that only pixel output voltages based on the incident light can be measured. In some embodiments of the disclosed technology, the correlated double sampler (CDS) 200 may sample and hold voltage levels of image signals received from the image pixels of the pixel array 100 and voltage levels of phase signals received from the phase detection pixels of the pixel array 100. For example, the correlated double sampler (CDS) 200 may sample a voltage level of the image signal received from the pixel array 100, a voltage level of the phase signal received from the pixel array 100, and a reference voltage level in response to a clock signal received from the timing generator 600 to provide, to the analog-to-digital converter (ADC) 300, an analog signal corresponding to a difference between the reference voltage level and the voltage level of each of the phase signal and the image signal.

The analog-to-digital converter (ADC) 300 may convert an analog signal received from the correlated double sampler (CDS) 200 into a digital signal in response to a clock signal received from the timing generator 600 and a ramp signal received from the ramp signal generator 800.

The buffer 400 may latch the digital signals received from the analog-to-digital converter (ADC) 300 to amplify the digital signals and output the amplified digital signals.

The row driver 500 may activate selected rows of the pixel array 100 in response to an output signal of the timing generator 600.

The timing generator 600 may generate a timing signal to control the row driver 500, the correlated double sampler (CDS) 200, the analog-to-digital converter (ADC) 300, and the ramp signal generator 800.

The control register 700 may generate control signals to control the ramp signal generator 800, the timing generator 600, and the buffer 400.

The ramp signal generator 800 may generate a ramp signal to control signals output to the buffer 400 in response to a control signal of the control register 700 and a timing signal received from the timing generator 600.

Figure 2:
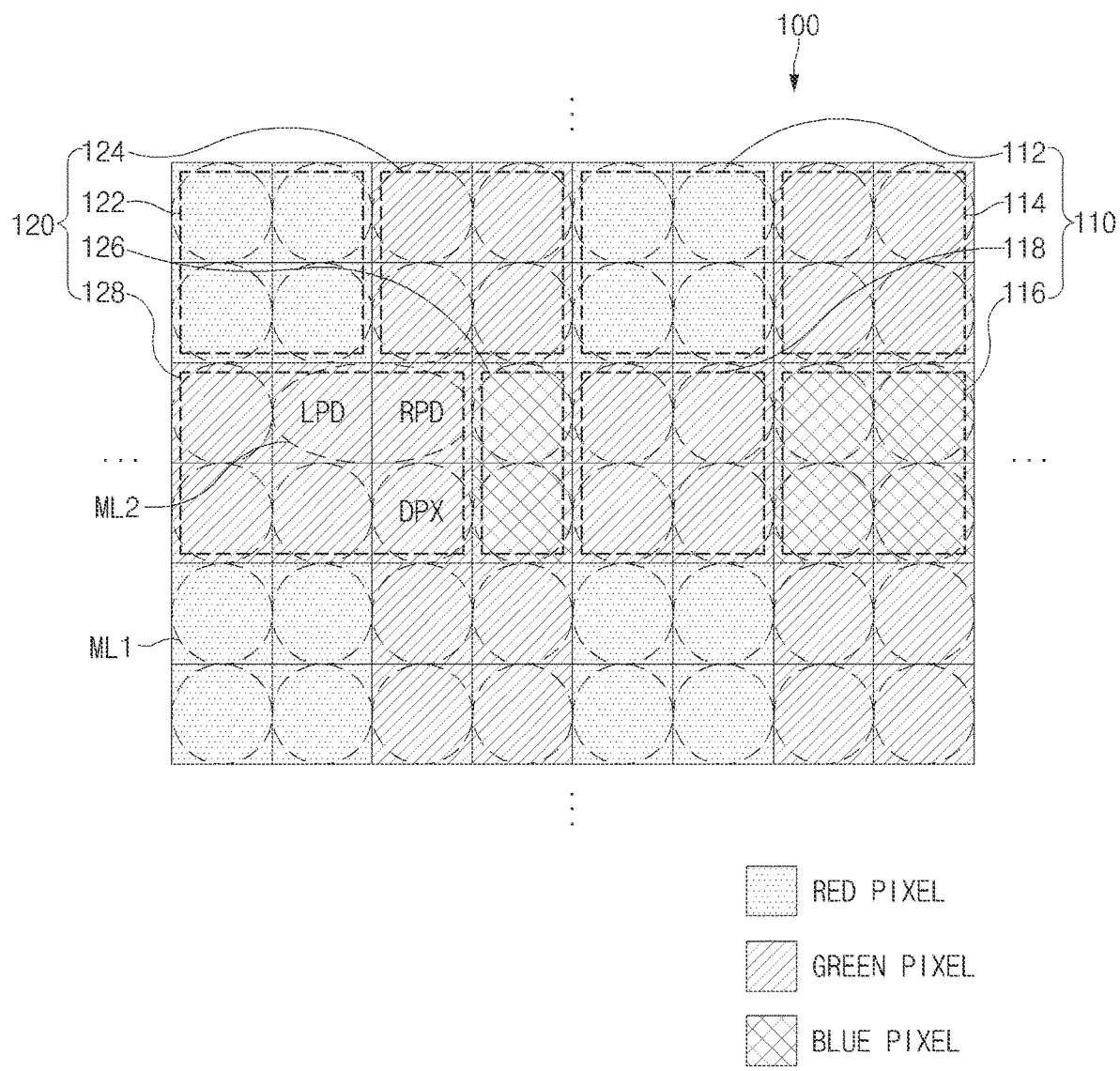
FIG. 2 is a schematic diagram illustrating an example of a pixel array shown in FIG. 1 based on some implementations of the disclosed technology.

FIG. 2 is a schematic diagram illustrating an example of the pixel array 100 shown in FIG. 1 that includes phase detection pixels arranged based on some implementations of the disclosed technology.

In some implementations, the pixel array 100 may include a plurality of first unit pixel arrays 110 and a plurality of second unit pixel arrays 120.

Each of the first unit pixel arrays 110 may include four sub-pixel arrays 112, 114, 116, and 118. Each of the four sub-pixel arrays 112, 114, 116, and 118 may include four unit-pixels of the same color arranged in a (2×2) array. The sub-pixel arrays 112, 114, 116, and 118 may be arranged in a Bayer pattern.

For example, the sub-pixel array 112 may include four unit-pixels with red color filters (i.e., four red pixels) arranged in a (2×2) array. The sub-pixel array 114 may be arranged contiguous (or adjacent) to the sub-pixel array 112 in a first direction (i.e., a row direction), and may include four unit-pixels with green color filters (i.e., four green pixels) arranged in a (2×2) array. The sub-pixel array 116 may be arranged contiguous (or adjacent) to the sub-pixel array 114 in a second direction (i.e., a column direction) perpendicular to the first direction, and may include four unit-pixels with blue color filters (i.e., four blue pixels) arranged in a (2×2) array. The sub-pixel array 118 may be arranged contiguous (or adjacent) to the sub-pixel array 112 in the second direction, and may include four unit pixels with green color filters (i.e., four green pixels) arranged in a (2×2) structure.

The unit pixels arranged in the first unit pixel array 110 may be implemented as image pixels for generating image signals.

Each of the second unit pixel arrays 120 may include sub-pixel arrays 122 and 124, a sub-pixel array 126, and a sub-pixel array 128. Each of the sub-pixel arrays 122 and 124 may include four-unit pixels of the same color arranged in a (2×2) array. The sub-pixel array 126 may include two unit-pixels that are arranged contiguous (or adjacent) to each other in the second direction while having the same color. The sub-pixel array 128 may include six unit-pixels that are contiguous (or adjacent) to each other in a (3×2) structure while having the same color.

For example, the sub-pixel array 122 may include four unit-pixels with red color filters (i.e., four red pixels) arranged in a (2×2) array. The sub-pixel array 124 may be arranged contiguous (or adjacent) to the sub-pixel array 122 in the first direction, and may include four unit pixels with green color filters (i.e., four green pixels) arranged in a (2×2) array. The sub-pixel array 126 may be arranged contiguous (or adjacent) to the sub-pixel array 124 in the second direction, and may include two unit pixels with blue color filters (i.e., two blue pixels) arranged in a (1×2) array. The sub-pixel array 128 may be arranged contiguous (or adjacent) to the sub-pixel array 122 and the sub-pixel array 124 in the second direction, and may include six unit pixels with green color filters (i.e., six green pixels) arranged in a (3×2) array.

The unit pixels arranged in the sub-pixel arrays 122, 124, and 126 may be implemented as image pixels for generating image signals. The sub-pixel array 128 may include image pixels, a pair of phase detection pixels LPD and RPD. In an example situation, the sub-pixel array 128 may include a defective pixel DPX.

For example, the sub-pixel array 122 of the second unit pixel array 120 may include image pixels that are arranged in the same manner as the image pixels in the sub-pixel array 112 of the first unit pixel array 110, and the sub-pixel array 124 of the second unit pixel array 120 may include image pixels that are arranged in the same manner as the image pixels in the sub-pixel array 114 of the first unit pixel array 110. In some implementations, in the second unit pixel array 120, the sub-pixel array 122 having red color filters and the sub-pixel array 124 having green color filters and contiguous (or adjacent) to the sub-pixel array 122 in the first direction may include image pixels that are arranged in the same manner as the image pixels in the sub-pixel arrays 112 and 114 of the first unit pixel array 110. The sub-pixel array 126 having blue color filters may include only two unit-pixels unlike the sub-pixel array 116 of the first unit pixel array 110. Instead, the sub-pixel array 128 may include six unit-pixels having green color filters. In the sub-pixel array 128, two unit-pixels that are consecutively arranged in the first direction (i.e., a row direction) while being contiguous (or adjacent) to the sub-pixel array 126 may be used as one pair of phase detection pixels LPD and RPD for detecting a phase difference in a row direction. In addition, the unit pixel DPX contiguous (or adjacent) to the phase detection pixel RPD in the second direction within the sub-pixel array 128 may be treated as a defective pixel. In other words, the unit pixel DPX located immediately below the phase detection pixel RPD in a column direction may be formed to have the same color filter as the phase detection pixel RPD, and may be treated as a defective pixel without being used as the phase detection pixel or the image pixel.

One microlens ML1 may be formed over each of the image pixels. One microlens ML1 may also be formed over a defective pixel DPX. A microlens ML2 covering both the phase detection pixels LPD and RPD may be formed over the phase detection pixels LPD and RPD.

Although FIG. 2 illustrates one pair of phase detection pixels LPD and RPD as being disposed at an upper portion of the sub-pixel array 128 and the defective pixel DPX as being disposed at a lower portion of the sub-pixel array 128, it should be noted that the locations of the phase detection pixels LPD and RPD and the locations of the defective pixel DPX can be switched. For example, one pair of the phase detection pixels LPD and RPD may be disposed at a lower portion of the sub-pixel array 128 and the defective pixel DPX may be disposed at an upper portion of the sub-pixel array 128.

In some implementations, the unit pixel DPX located below the phase detection pixel RPD has the same color filter as the phase detection pixel RPD and the unit pixel DPX is treated as a defective pixel, as will be discussed below in more detail.

In the case where the phase detection pixels LPD and RPD for detecting a phase difference in row direction are formed in the pixel array 100 having a quad array arranged in a Bayer pattern (e.g., quad Bayer color filter array), the phase detection pixels LPD and RPD may be formed using one green unit pixel and one blue unit pixel that are arranged contiguous (or adjacent) to each other in a row direction. In this case, since the phase detection pixels LPD and RPD should have the same conditions, the phase detection pixels LPD and RPD are formed with the same color. Therefore, as shown in FIG. 3, the unit pixel used as the phase detection pixel RPD from among four blue unit pixels may be implemented as a green unit pixel.

Figure 3:
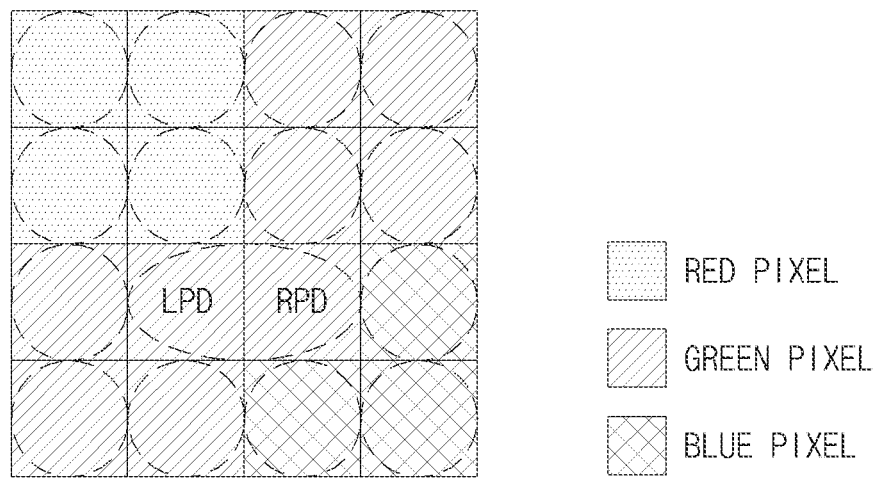
FIG. 3 is a schematic diagram illustrating an example pixel array where one of blue color pixels in a quad color filter array is used as a phase detection pixel based on some implementations of the disclosed technology.

However, when the color filters are arranged as shown in FIG. 3, pixels with the same color are arranged in a bent pattern. In such a situation, the color filters may be abnormally formed at the bent region. In this case, operational characteristics of the image sensing device may be deteriorated.

Therefore, in some implementations of the disclosed technology as shown in FIG. 2, the unit pixel DPX located immediately below the phase detection pixel RPD may be formed to have the same color filter as the phase detection pixel RPD, and in this way the color filters can be normally formed. In contrast, the color filter of the unit pixel DPX is formed to have a different color filter to address the above-mentioned issues in a fabrication process. Thus, when the unit pixel DPX is treated like a normal pixel, an image signal corresponding to green color may be distorted in a signal processing of the second unit pixel array 120. Therefore, in the signal processing such as a dead pixel compensation (DPC) process, the unit pixel DPX can be treated as a defective pixel.

Figure 4:
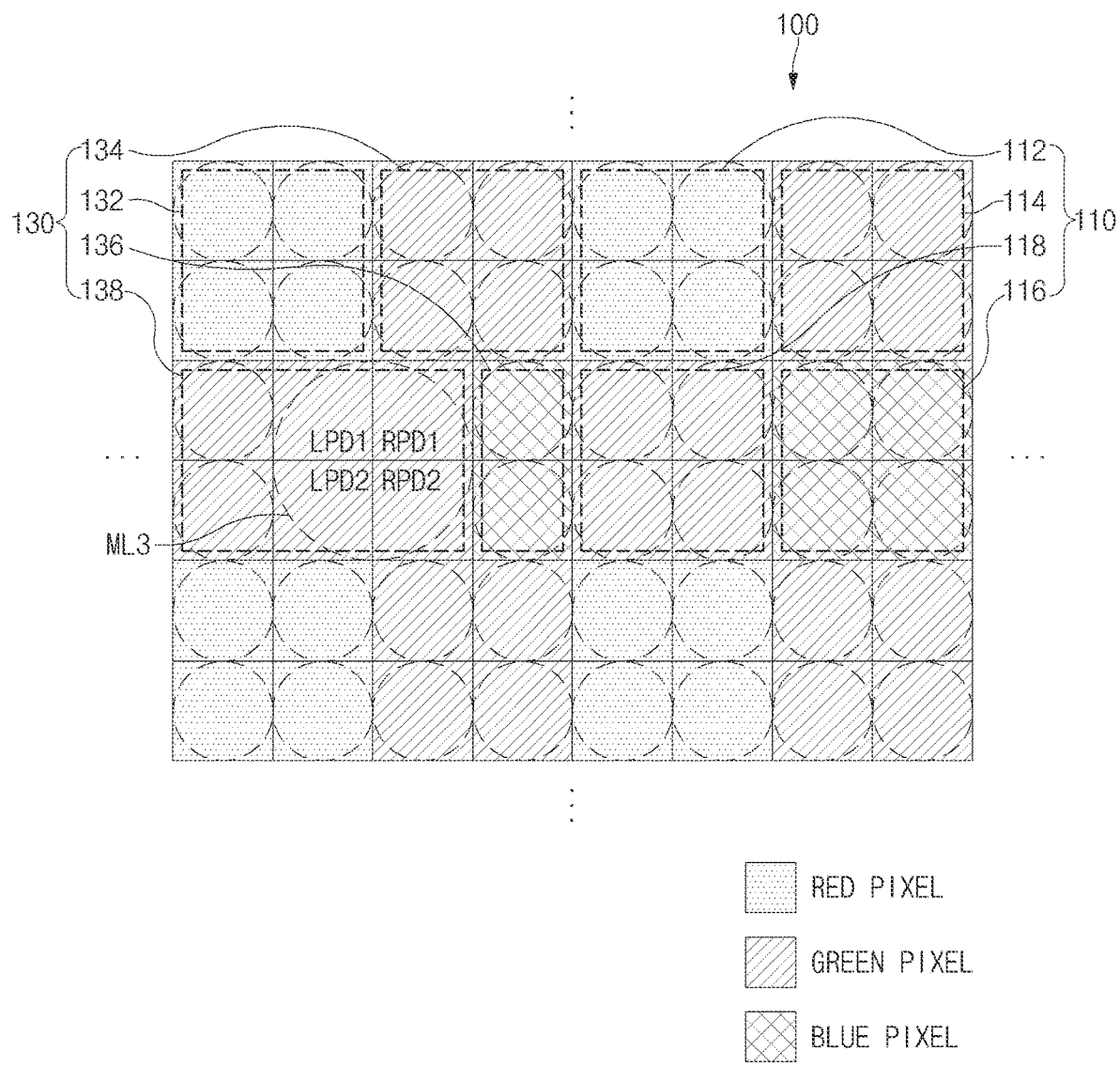
FIG. 4 is a schematic diagram illustrating an example of a pixel array shown in FIG. 1 based on some other implementations of the disclosed technology.

FIG. 4 is a schematic diagram illustrating an example of the pixel array 100 shown in FIG. 1 that includes phase detection pixels arranged based on some implementations of the disclosed technology.

In some implementations, the pixel array 100 may include first unit pixel arrays 110 and third unit pixel arrays 130.

Each of the first unit pixel arrays 110 may include four sub-pixel arrays 112, 114, 116, and 118. Each of the four sub-pixel arrays 112, 114, 116, and 118 may include four unit-pixels of the same color arranged in a (2×2) array. The sub-pixel arrays 112, 114, 116, and 118 may be arranged in a Bayer pattern.

The first unit pixel array 110 shown in FIG. 4 is identical to the first unit pixel array 110 shown in FIG. 2, and as such a detailed description thereof will herein be omitted for convenience of description.

Each of the third unit pixel arrays 130 may include sub-pixel arrays 132 and 134, a sub-pixel array 136, and a sub-pixel array 138. Each of the sub-pixel arrays 132 and 134 may include four unit-pixels of the same color arranged in a (2×2) array. The sub-pixel array 136 may include two unit-pixels of the same color that are arranged contiguous (or adjacent) to each other. The sub-pixel array 138 may include six unit-pixels of the same color that are arranged contiguous (or adjacent) to each other in a (3×2) array.

The third unit pixel array 130 shown in FIG. 4 may be different from the second unit pixel array 120 shown in FIG. 2 in terms of the sub-pixel array 138 including phase detection pixels. For example, the sub-pixel array 138 may include four phase detection pixels LPD1, LPD2, RPD1, and RPD2 arranged in a (2×2) array.

In a situation in which phase detection pixels LPD1, LPD2, RPD1, and RPD2 are arranged in a (2×2) structure, two left phase detection pixels LPD1 and LPD2 may be treated as a single phase detection pixel LPD and two right phase detection pixels RPD1 and RPD2 may be treated as a single phase detection pixel RPD, such that a phase difference in a row direction can be detected. For example, phase signals of the phase detection pixels LPD1 and LPD2 are combined and used as a single left phase signal, and phase signals of the phase detection pixels RPD1 and RPD2 are combined and used as a single right phase signal, such that a phase difference in a row direction can be detected. In addition, a phase difference in a row direction and a phase difference in a column direction can be detected. For example, phase signals of the phase detection pixels LPD1 and RPD1 are combined and used as a single upper phase signal, and phase signals of the phase detection pixels LPD2 and RPD2 are combined and used as a single lower phase signal, such that a phase difference in a column direction can be detected.

The phase detection pixels LPD1, LPD2, RPD1, and RPD2 may be arranged contiguous or adjacent to the sub-pixel array 136. One microlens ML3 covering all of the phase detection pixels LPD1, LPD2, RPD1, and RPD2 may be formed over the phase detection pixels LPD1, LPD2, RPD1, and RPD2.

By way of example, the phase detection pixels may be formed in the pixel array including four unit pixels of the same color contiguous or adjacent to each other in a (2×2) array as discussed above. In another implementation, in the pixel array including the unit pixels of the same color contiguous or adjacent to each other in an (L× L) array (where L is a natural number greater than 2), the phase detection pixels and the color filters may be formed to prevent a bent color filter pattern from occurring in the formation region of the phase detection pixels.

As is apparent from the above description, the image sensing device including phase detection pixels based on some implementations of the disclosed technology can improve operational characteristics of the phase detection pixels.

What is claimed is:

1. An image sensing device comprising:
a first sub-pixel array including a plurality of first unit pixels including first photosensing elements that are located adjacent to one another and are structured to generate photocharges by converting incident light and first color filters located over the first photosensing elements;
a second sub-pixel array including a plurality of second unit pixels including second photosensing elements that are located adjacent to one another and are structured to generate photocharges by converting incident light and second color filters located over the second photosensing elements;
a third sub-pixel array including third photosensing elements that are located adjacent to one another and are structured to generate photocharges by converting incident light and third color filters located over the third photosensing elements; and
a fourth sub-pixel array including fourth photosensing elements that are located adjacent to one another and are structured to generate photocharges by converting incident light and fourth color filters located over the fourth photosensing elements,
wherein the second sub-pixel array is arranged adjacent to the first sub-pixel array in a first direction,
wherein the third sub-pixel array is arranged adjacent to the second sub-pixel array in a second direction perpendicular to the first direction,
wherein the fourth sub-pixel array is arranged adjacent to the first sub-pixel array and the second sub-pixel array in the second direction,
wherein the fourth sub-pixel array further includes a plurality of phase detection pixels for detecting a phase difference and a first pixel located adjacent to one of the plurality of phase detection pixels in the second direction, and
wherein the first pixel is treated as a defective pixel.

2. The image sensing device according to claim 1, wherein the plurality of phase detection pixels in the fourth sub-pixel array includes:
a first phase detection pixel and a second phase detection pixel that are arranged adjacent to each other in the first direction.

3. The image sensing device according to claim 2, wherein:
the second phase detection pixel is located at a first side of the first phase detection pixel, and is arranged adjacent to the third sub-pixel array.

4. The image sensing device according to claim 2, wherein:
the first phase detection pixel is located adjacent to the first sub-pixel array in the second direction; and
the second phase detection pixel is located adjacent to the second sub-pixel array in the second direction.

5. The image sensing device according to claim 2, wherein the first pixel is located adjacent to the second phase detection pixel in the second direction.

6. The image sensing device according to claim 1, wherein:
each of the first sub-pixel array and the second sub-pixel array includes a plurality of unit pixels arranged in a (2×2) array.

7. The image sensing device according to claim 1, wherein:
the first color filter, the second color filter, the third color filter, and the fourth color filter are a red color filter, a green color filter, a blue color filter, and the green color filter, respectively.

8. An image sensing device comprising:
a first sub-pixel array including a plurality of first unit pixels including first photosensing elements that are located adjacent to one another and are structured to generate photocharges by converting incident light and first color filters located over the first photosensing elements;
a second sub-pixel array including a plurality of second unit pixels including second photosensing elements that are located adjacent to one another and are structured to generate photocharges by converting incident light and second color filters located over the second photosensing elements;
a third sub-pixel array including third photosensing elements that are located adjacent to one another and are structured to generate photocharges by converting incident light and third color filters located over the third photosensing elements; and
a fourth sub-pixel array including fourth photosensing elements that are located adjacent to one another and are structured to generate photocharges by converting incident light and fourth color filters located over the fourth photosensing elements,
wherein the second sub-pixel array is arranged adjacent to the first sub-pixel array in a first direction,
wherein the third sub-pixel array is arranged adjacent to the second sub-pixel array in a second direction perpendicular to the first direction,
wherein the fourth sub-pixel array is arranged adjacent to the first sub-pixel array and the second sub-pixel array in the second direction,
wherein the fourth sub-pixel array further includes a plurality of phase detection pixels for detecting a phase difference,
wherein each of the first sub-pixel array and the second sub-pixel array includes a plurality of unit pixels arranged in a (2×2) array, and
wherein the fourth sub-pixel array includes:
a plurality of unit pixels arranged in a (3×2) array in which three unit pixels are arranged in the first direction and two unit pixels are arranged in the second direction.

9. The image sensing device according to claim 8, wherein:
the first color filter, the second color filter, the third color filter, and the fourth color filter are a red color filter, a green color filter, a blue color filter, and the green color filter, respectively.

10. The image sensing device according to claim 8, wherein the plurality of phase detection pixels in the fourth sub-pixel array includes:
a first phase detection pixel and a second phase detection pixel that are arranged adjacent to each other in the first direction.

11. An image sensing device comprising:
a pixel array including a plurality of unit pixels structured to generate an electrical signal by performing photoelectric conversion of incident light and consecutively arranged in a first direction and a second direction perpendicular to the first direction,
wherein the pixel array includes:

a first unit pixel array including unit pixels with first to third color filters arranged in a first color pattern; and a second unit pixel array including unit pixels with the first to third color filters arranged in a second color pattern, wherein the unit pixels of the first unit pixel array are image pixels structured to detect incident light from a target object to generate an image signal representing the target object by converting an optical image of the target object to an electrical signal, and wherein the second unit pixel array includes:
  image pixels configured to generate the image signal;
  phase detection pixels structured to detect a phase difference between optical signals from the target object; and
  a first pixel located adjacent to one of the phase detection pixels,
  wherein the first pixel is treated as a defective pixel.

12. The image sensing device according to claim 11, wherein the first unit pixel array includes:
  a first sub-pixel array including M unit pixels with the first color filters arranged adjacent to each other;
  a second sub-pixel array including M unit pixels with the second color filters and arranged adjacent to the first sub-pixel array in the first direction;
  a third sub-pixel array including M unit pixels with the third color filters and arranged adjacent to the second sub-pixel array in the second direction; and
  a fourth sub-pixel array including M unit pixels with the second color filters and arranged adjacent to the first sub-pixel array in the second direction.

13. The image sensing device according to claim 12, wherein the second unit pixel array includes:
  a fifth sub-pixel array including M unit pixels with the first color filters arranged adjacent to each other;
  a sixth sub-pixel array including M unit pixels with the second color filters and arranged adjacent to the fifth sub-pixel array in the first direction;
  a seventh sub-pixel array including (M−N) unit pixels with the third color filters and arranged adjacent to the sixth sub-pixel array in the second direction; and
  an eighth sub-pixel array structured to have the phase detection pixels and the first pixel in a manner that (M+N) unit pixels with the second color filters are arranged adjacent to each other, and arranged adjacent to the fifth sub-pixel array and the sixth sub-pixel array in the second direction.

14. The image sensing device according to claim 13, wherein the phase detection pixels includes:
  a first phase detection pixel and a second phase detection pixel arranged adjacent to each other in the first direction.

15. The image sensing device according to claim 14, wherein:
  the second phase detection pixel is located at a first side of the first phase detection pixel, and is arranged adjacent to the seventh sub-pixel array.

16. The image sensing device according to claim 14, wherein the
  first pixel is located adjacent to the second phase detection pixel in the second direction.

17. The image sensing device according to claim 13, wherein each of the phase detection pixels includes:
  first to fourth phase detection pixels arranged in a (2×2) array in which the first to fourth phase detection pixels are arranged adjacent to each other in the first direction and the second direction.

18. The image sensing device according to claim 13, wherein each of the fifth sub-pixel array and the sixth sub-pixel array includes a plurality of unit pixels arranged in a (2×2) array.

19. The image sensing device according to claim 18, wherein the eighth sub-pixel array includes a plurality of unit pixels arranged in a (3×2) array in which three unit pixels are arranged in the first direction and two unit pixels are arranged in the second direction.

20. The image sensing device according to claim 11, wherein:
  the first color filter, the second color filter, and the third color filter are a red color filter, a green color filter, and a blue color filter, respectively.

* * * * *